United States Patent
Weber

[11] Patent Number: 5,556,075
[45] Date of Patent: Sep. 17, 1996

[54] HIGH PRESSURE VALVE

[76] Inventor: Günter Weber, Hauptplatz 23, A-2474 Gattendorf, Austria

[21] Appl. No.: 39,254

[22] PCT Filed: Oct. 17, 1991

[86] PCT No.: PCT/AT91/00112

§ 371 Date: Apr. 15, 1993

§ 102(e) Date: Apr. 15, 1993

[87] PCT Pub. No.: WO92/07208

PCT Pub. Date: Apr. 30, 1992

[30] Foreign Application Priority Data

Oct. 18, 1990 [AT] Austria ........................... 2101/90

[51] Int. Cl.⁶ ................................................. F16K 25/00
[52] U.S. Cl. ........................... 251/368; 251/366; 251/282
[58] Field of Search .................................. 251/368, 282, 251/366, 367, 281

[56] References Cited

U.S. PATENT DOCUMENTS

| 385,052 | 6/1888 | Hodges et al. | 251/368 X |
| 2,695,628 | 11/1954 | Wheildon, Jr. | 251/368 X |
| 2,797,061 | 6/1957 | Buchanan | 251/282 X |
| 3,060,970 | 10/1962 | Aslan | 251/368 X |
| 3,770,009 | 11/1973 | Miller | 251/368 X |

Primary Examiner—Kevin Lee
Attorney, Agent, or Firm—Karl Hormann

[57] ABSTRACT

High pressure valve having a valve cone (12) guided by a valve spindle (10) within a valve housing (1, 2), the sealing surface (13) of the valve cone engaging, in the closed position, an annular ridge (15) of hard metal constituting a valve seat, whereby the sealing surface (13) at least of the valve cone (12) is made of a soft metal, preferably aluminum.

8 Claims, 1 Drawing Sheet

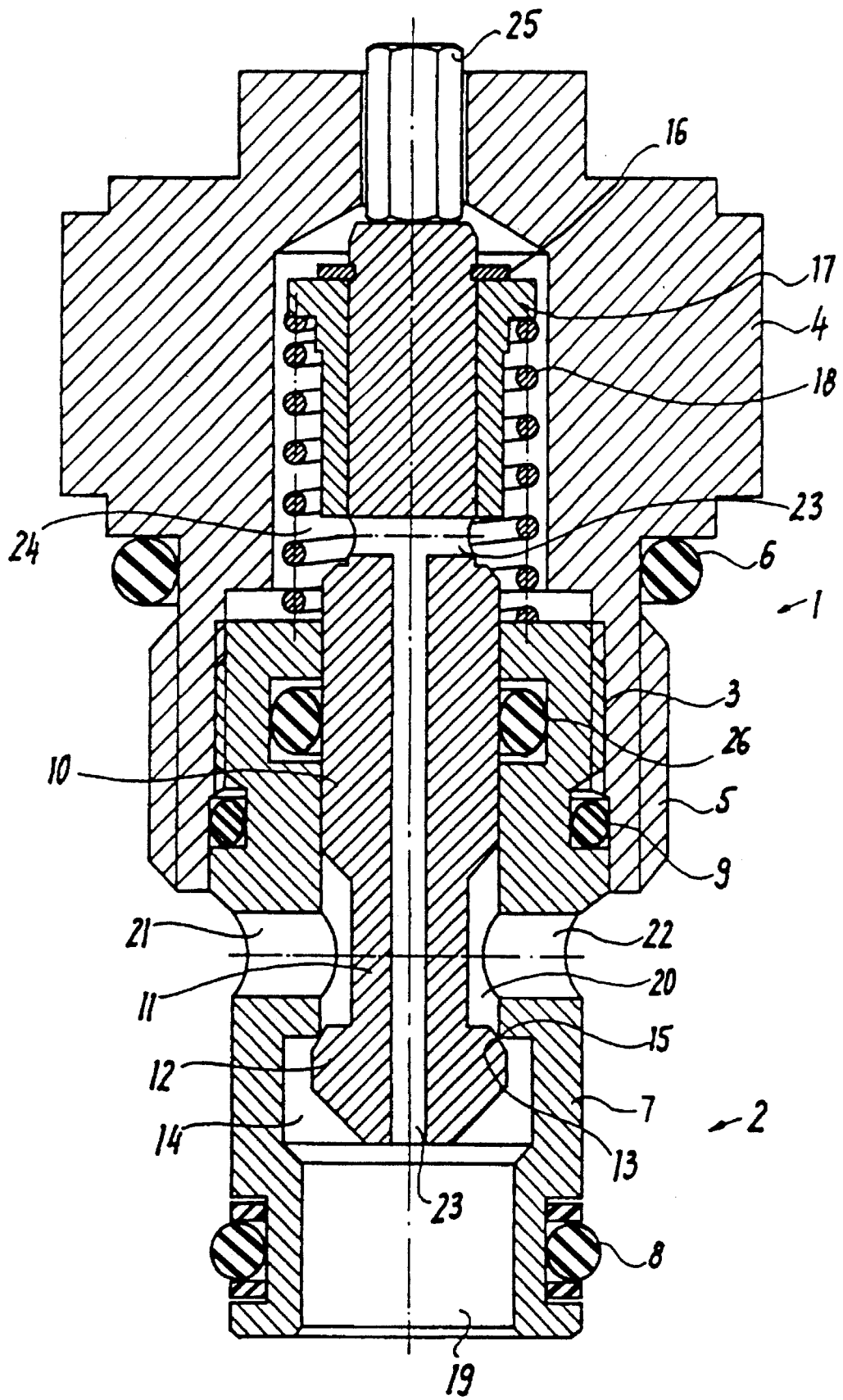

HIGH PRESSURE VALVE

BACKGROUND OF THE INVENTION

The invention relates to a high pressure valve having a valve cone guided by a valve spindle within a valve housing, which valve cone in its closed position engages an annular ridge of hard metal, in particular steel, consituting a valve seat.

Such valves make use of the plastic deformation to which the soft sealing surface is subjected when engaging the hard metal seat, to ensure a constant sealing effect of the valve over an extended period of time. Such a valve has been described, for instance, in German laid-open patent specification DE-A-1 190 756. In the known valves the valve cone is made of copper or of copper-plated or gold-plated steel, and is mounted on a conventional valve spindle, made, for instance, of steel. Such construction requires the separate manufacturing steps of assembly, and the plating of the valve cones, as the case may be.

Furthermore, steel spindles and valve cones made of steel have a high mass inertia which at periodic switching operations of the valve leads to a dynamic pressure loss in the range of about 4–5 bar. Finally, such cone/spindle structures are unsuited for actuation by an electromagnet as they are potentially subject to magnetization.

SUMMARY OF THE INVENTION

It is, therefore, an object of the invention to provide a high pressure valve of the structure referred to in the introduction, which is extremely tight, is of a low mass inertia in a switching operation, and in which the spindle and the valve cone may be assembled in a simple manner and may be actuated by an electromag-net. In accordance with the invention, this object is accomplished by the valve cone, the sealing surface and the valve spindle being an integral structure made of aluminum, and by the valve being a pressure compensated high pressure valve. In accordance with the invention, the dynamic mass of the valve spindle/valve cone structure and, hence—in a periodically switched valve—the dynamic pressure loss is reduced. Furthermore, the manufacture of the valve is simplified because of the one-piece structure of the valve cone, the sealing surface, and the valve spindle. In addition, because of the non-magnetec property of aluminum, an additional advantage is obtained, in that magnetization of the cone/spindle structure by an electromagnet used for actuating the spindle, is avoided. Magnetization does occur in known steel spindles and results in additional dynamic pressure losses because of the attraction forces of the magnetized parts, and in disturbing inherent spindle movements which have not been completely understood.

In the pressure compensated valve structure in accordance with the invention, the aluminum sealing surface is not pressed against the steel annular ridge at full operating pressure, rather, the pressure is generated entirely by the control force acting upon the spindle. It can be seen that because of that, wear of the soft metal sealing surface over an extended time is substantially avoided.

BRIEF DESCRIPTION OF THE DRAWING

The invention will be explained in more detail with reference to the drawing which depicts a two-position, two-way valve in longitudinal section, with the sealing arrangement in accordance with the invention.

DESCRIPTION OF THE PREFERRED EMBODIMENT

The valve is provided with a two-part valve housing 1, 2, the upper part 1 of which at 3 is threaded to the lower part 2. At its upper end the upper part 1 is provided with a terminal flange 4, and at its lower end it is provided with an external thread 5 having standardized outer dimensions, so that the upper part 1, together with the threaded-in lower part 2, may be screwed into a standardized threaded valve receiving bore. A flange seal 6 assures a leak-proof seat of the valve in the threaded bore (not shown). Valves of this kind are also called screw-in cartridge valves (cartridge valves).

The lower part 2 of the housing has a lesser external diameter than the upper part 1 of the housing and in a screwed-in condition thus constitutes a lower valve section 7 of reduced outer diameter at the lower end of which there is arranged an O-ring 8 positioned within an annular groove. This O-ring 8 serves as a circumferential seal of the lower section 7 in a reduced diameter bore section of the threaded bore (not shown) within which the valve is received.

The connection between the housing parts 1, 2 is sealed by a further O-ring 9.

The housing parts 1, 2 are permeated by a shoulder provided with a plurality of shoulders in which the valve spindle 10 is guided for axial movement. The spindle 10 is provided, at its lower end, with a section 11 of reduced diameter which is extending into a valve head of increased diameter. The upper margin of of the valve head 12 adjacent the section 11 is obliquely shaped thus forming a truncated or frusto-conical surface 13 which imparts to the valve head the function of a valve cone. The head of the spindle, that is to say, the valve cone, is movable within a section 14 of increased inner diameter of the lower housing part 2, and, with the truncated or frusto-conical surface 13 functioning as a sealing surface, it engages an annular ridge 15, in the closed position of the valve. The annular ridge is formed by the transition between the widened section 14 of the bore in which the valve cone is moving, and the axial section of the bore in which the valve spindle 10 is moving.

At its upper end the valve spindle 10 is provided with a flange 17 retained by a clamping ring 16, which flange 17 arrests a spring 18 the other end of which is supported by the upper front surface of the lower housing part 2. In this manner, the valve spindle 10 is biased in an upward direction, so that the sealing surface 13 of the valve cone 12 is pressed against the annular ridge 15 of the lower housing part 2. Therefore, the annular valve gap between the sealing surface 13 and the annular ridge 15 is closed in the depicted idle position of the valve.

The pressure chamber 19 of the bore below the valve cone 12 forms one of the pressure connections of the valve, and the annular chamber 20 formed above the annular gap in the area of the valve spindle section 11 of reduced diameter is provided with two diametrically opposite radial bores 21, 22 which provide the other pressure connections of the valve. The pressure extant within the annular chamber 20 simultaneously effects the upper and the lower shoulder surfaces of the spindle section 11, and is thus balanced in its effect upon the spindle 10.

The pressure chamber 19 is connected to a counter pressure chamber 24 by way of a bore or conduit 23 permeating the valve cone 12 and the valve spindle 10. The counter pressure chamber 24 is formed by a bore section of increased diameter within the upper housing section 1 and occupies the entire upper end of the valve spindle 10 including the biasing arrangement 16–18. Thus, the pressure present at the valve connection 19 is diverted to both sides of the valve spindle, and is equalized.

Because of the pressure compensation at the connections 19, 21, 22 no axial force will act upon the spindle when the valve is subjected to pressure acting in the flow-through direction. The force for closing the valve is thus generated solely by the spring force of the biasing spring 18.

For actuating the valve spindle, a bolt 25 acting upon the upper front surface of the spindle 10, is movably provided within the upper housing part 1. The bolt 25 may be actuated, for instance, by an electromagnet (not shown).

For sealing the valve output connection 21, 22 relative to the pressure chambers 19, 24 there is provided a packing 26 which sealingly embraces the spindle 10 in the lower housing part 2 in the area between the output connections 21 and 22 and the counter pressure chamber 24.

This structure corresponds to the conventional pressure compensated two-position, two-way valves which are available as screw-in valve cartridges with standardized exterior dimensions.

In accordance with the invention, the entire structure of valve spindle 10, valve cone 12 and sealing surface 13 is made of aluminum. The sealing surface 13 is precision lathed.

In the sealing gap an aluminum sealing surface faces an annular ridge 15 made of steel. During initial switching operations, the annular ridge 15 will slightly emboss itself into the sealing surface 13 and provide for an excellent seal. Even after a long service and frequent switching operations the aluminum will not deform further, so that the excellent sealing effect is maintained over an extended period.

In an actual embodiment a maximum loss of pressure of 4 bar/24 h was detected at an operating pressure of 200 bar. The same pressure loss of 4 bar/24 h was still detected after a long operating time involving 200,000 switching operations.

The basic material used for the valve spindle 10 and for the valve cone 12 was aluminum with a tensile strength of 340N/mm$^2$. Compared to steel, this material has a substantially lower specific mass and, hence, substantially lower inertia. The dynamic pressure loss in periodic switching operations is thus reduced to 1–2 bar. It should be added, that because of its non-magnetic property, aluminum is not magnetized by an electromagnet required for the actuation of the spindle, whereby disturbance effects hitherto occurring in steel spindles during switching operations and not wholly explainable, are avoided.

Furthermore, it can be seen that in the depicted embodiment the valve spindle 10 may be removed in a downward direction and replaced after removal of the clamping ring 16. This has not been possible with steel valve cones and steel sealing surfaces hitherto used, because the valve seat was optimized by forcibly jamming the valve cone 12 into the annular ridge valve seat 15, whereby the sealing surface 13 of hardened steel formed an downwardly directed flange in the annular ridge 15 which rendered removal of the valve spindle impossible.

It will be appreciated that the invention is not restricted in its applicability to the two-position, two-way screw-in valve type, but that it is applicable to all valves of the kind in which the valve cone, in the closed position, engages an annular ridge constituting a valve seat.

What is claimed is:

1. A pressure compensated high pressure valve, comprising:

means forming a valve housing having an elongate recess therein;

valve seat means positioned within said elongate recess and comprising an annular ridge made of steel;

valve spindle means provided with integral valve head means comprising a substantially conical surface adapted in the closed condition of said valve to engage said annular ridge, said valve spindle means, said valve head means and said surface being made of aluminum; and means for moving said conical surface into and out of engagement with said annular ridge.

2. The high pressure valve of claim 1, wherein said moving means comprises means engaging said valve spindle means for selectively moving said conical surface out of engagement with said annular ridge and spring means for biasing said conical surface into engagement with said annular ridge.

3. The high pressure valve of claim 2, wherein said valve spindle means extends through said annular ridge and wherein said valve head means is located on one side of said annular ridge and said moving means is located on an opposite side of said annular ridge.

4. The high pressure valve of claim 3, wherein said elongate recess comprises an opening in a plane parallel to said annular ridge and said valve head means is provided between said opening and said annular ridge.

5. The high pressure valve of claim 4, wherein said valve housing comprises at least one radial bore extending into said elongate recess on the side of said annular ridge opposite said valve head means.

6. The high pressure valve of claim 5, wherein said frustro-conical surface is deformed into conforming relationship with said annular ridge thereby to form an effective seal when in engagement therewith.

7. The high pressure valve of claim 6, wherein said valve housing comprises a plurality of axially aligned housing portions threadedly connected to each other.

8. The high pressure valve of claim 4, wherein said elongate recess comprises counterpressure chamber means connected to said opening by conduit means extending through said valve spindle means.

* * * * *